(12) United States Patent  
Alfoqaha et al.

(10) Patent No.: US 6,859,343 B1  
(45) Date of Patent: Feb. 22, 2005

(54) HYBRID DIFFUSER FOR MINIMIZING THERMAL POLE TIP PROTRUSION AND READER SENSOR TEMPERATURE

(75) Inventors: Arshad Ahmed Alfoqaha, San Jose, CA (US); Edmund Bruno Fanslau, Jr., San Jose, CA (US)

(73) Assignee: Western Digital, Inc., Fremont, CA (US)

( * ) Notice: Subject to any disclaimer, the term of this patent is extended or adjusted under 35 U.S.C. 154(b) by 51 days.

(21) Appl. No.: 10/100,751

(22) Filed: Mar. 19, 2002

(51) Int. Cl.[7] .............................................. G11B 5/147
(52) U.S. Cl. ...................................... 360/126; 360/317
(58) Field of Search ................................ 360/126, 155, 360/317, 318, 319, 234.7, 110, 322; 428/692; 451/29

(56) References Cited

U.S. PATENT DOCUMENTS

| 4,219,854 | A | | 8/1980 | Church et al. .............. 360/123 |
| 5,822,153 | A | * | 10/1998 | Lairson et al. ........... 360/234.7 |
| 5,833,516 | A | * | 11/1998 | De Haas et al. .............. 451/29 |
| 5,991,113 | A | | 11/1999 | Meyer et al. ................. 360/75 |
| 6,396,670 | B1 | * | 5/2002 | Murdock ..................... 360/319 |
| 6,538,843 | B1 | * | 3/2003 | Kuroe et al. ................ 360/110 |
| 2002/0039264 | A1 | * | 4/2002 | Ohsawa et al. ............. 360/322 |
| 2002/0048690 | A1 | * | 4/2002 | Fukuzawa et al. .......... 428/692 |
| 2002/0154451 | A1 | * | 10/2002 | Dimitrov et al. ........... 360/317 |

* cited by examiner

Primary Examiner—Tianjie Chen

(57) ABSTRACT

An enchance recording head design provides conduction and mechanical restraint control in order to minimize the pole tip protrusion and the head temperature resulting from the thermal heating of the magnetic recording head during operation. In one embodiment, the recording head includes a hybrid diffuser formed within an insulation layer, at a predetermined distance from the head write section. The hybrid diffuser is comprised of a thermal conduction layer with high thermal conductivity, such as gold or copper, and a mechanical restraint layer having near zero CTE, such as a 60–80% face-centered-cubic NiFe (Invar) material. The hybrid diffuser is recessed from the ABS to prevent the delamination of the hybrid diffuser due to the otherwise displacement incompatibility between the inner insulating layer and the hybrid diffuser at the ABS.

14 Claims, 11 Drawing Sheets

HYBRID DIFFUSER FOR MINIMIZING THERMAL POLE TIP PROTRUSION AND READER SENSOR TEMPERATURE

CROSS-REFERENCE TO RELATED APPLICATION

FIELD OF THE INVENTION

The present invention relates in general to data storage systems such as disk drives, and it particularly relates to a thin film magnetic read/write head for use in such data storage systems. More specifically, the present invention provides a method of incorporating a hybrid diffuser comprised of at least two layers: a layer of gold (or copper) and a layer of Invar into the magnetic recording head to provide a thermal diffusion and thermal expansion control in order to counteract undesirable pole tip protrusion resulting from thermal heating of the magnetic read/write head during operation, and to reduce the temperature of the reader sensor.

BACKGROUND OF THE INVENTION

In a conventional magnetic storage system, a thin film magnetic head includes an inductive read/write transducer mounted on a slider. The magnetic head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk. The flying height is defined as the spacing between the surface of the spinning magnetic disk and the lowest point of the slider assembly. One objective of the design of magnetic read/write heads is to obtain a very small flying height between the read/write element and the disk surface. By maintaining a flying height close to the disk, it is possible to record short wavelength or high frequency signals, thereby achieving high density and high storage data recording capacity.

The slider design incorporates an air bearing surface to control the aerodynamic interaction between the magnetic head and the spinning magnetic disk thereunder. Air bearing surface (ABS) sliders used in disk drives typically have a leading edge and a trailing edge at which thin film read/write heads are deposited. Generally, the ABS surface of a slider incorporates a patterned topology by design to achieve a desired pressure distribution during flying. In effect, the pressure distribution on the ABS contributes to the flying characteristics of the slider that control the flying height, pitch, yaw, and roll of the read/write head relative to the rotating magnetic disk. The read/write element generally is mounted at the trailing edge of the slider so that its forwardmost tip is generally flush with the ABS of the slider and is situated above the surface of the spinning magnetic disk by a small flying height typically of about 12.5 nm.

An exemplary magnetic read/write head includes a thin film recording head with a bottom pole (P1) and a top pole (P2). The pole P1 has a pole tip height dimension commonly referred to as "throat height". In a finished write head, the throat height is measured between an air bearing surface ("ABS"), formed by lapping and polishing the pole tip, and a zero throat level where the pole tip of the recording head transitions to a back region. The pole tip region is defined as the region between the ABS and the zero throat level. This region is also known as a pedestal, which is an extension of the pole P1. Similarly, the pole P2 has a pole tip height dimension commonly referred to as "nose length". In a finished recording head, the nose is defined as the region of the pole P2 between the ABS and the "flare position" where the pole tip transitions to a back region.

Each of the poles P1 and P2 has a pole tip located in the pole tip region. The tip regions of the poles P1 and P2 are separated by a magnetic recording gap, which is a thin layer of insulation material. During a write operation, the magnetic field generated by the pole P1 channels the magnetic flux from the pole P1 to the pole P2 through an intermediary magnetic disk, thereby causing the digital data to be recorded onto the magnetic disk.

During the operation of the magnetic read/write head, the magnetic recording head portion is typically subjected to various thermal sources that adversely cause ambient and localized heating effects of the recording head. One such thermal source is attributed to a heat transfer process to the magnetic read/write head from the effect of the spinning magnetic disk.

During a typical operation, the magnetic disk spins at a rapid rate of rotation, typically on the order of several thousands of revolutions per minute (RPM). This rapid rotation generates a source of friction of the ambient air between the ABS and the spinning magnetic disk, thus causing an elevation in the air temperature.

Furthermore, the heating of the motor that drives the magnetic disk causes an additional elevation of the air temperature. In totality, the ambient air temperature may rise from a room temperature of about 25° C. to as high as 85° C. Since initially the read/write head is typically at a room temperature, there exists a tendency for a heat transfer process to take place between the ambient air at a higher temperature and the read/write head at lower temperature. The heat transfer causes a rise in the temperature of the read/write head so as to promote a thermal equalization thereof with the ambient air temperature.

The temperature increase of the read/write head further causes a variant temperature distribution as a result of the thermal conduction of diverse materials that compose the read/write head. Since most wafer-deposited materials, such as those composing the poles P1 and P2, typically have greater coefficients of thermal expansion (CTE) than that of the substrate, the temperature increase effects a general positive displacement of the read/write head as well as a local pole tip protrusion beyond the substrate.

Additionally, the read/write head is also subjected to various sources of power dissipation resulting from the current supplied to the write coils, eddy current in the core, and the current in the read sensor. The power dissipation manifests itself as a localized heating of the recording head, thereby resulting in a temperature rise akin to the foregoing ambient temperature effect.

In a static test environment without the effect of the spinning magnetic disk, the localized heating may cause a temperature elevation of as high as 70° C. However, in an operating environment of a magnetic disk drive, the temperature rise resulting from the localized heating may be limited to about 40° C., primarily due to the alleviating effect of a convective heat transfer process induced by the rotating air between the pole tip region and the spinning magnetic disk. As a consequence of the localized heating, the temperature increase associated therewith further promotes an additional protrusion of the pole tip relative to the substrate.

A typical pole tip protrusion in a static environment may be about 30 to 35 nm. In an operating environment of a magnetic disk drive, the pole tip protrusion is reduced to a typical value of 7.5 nm to 12 nm. Since a typical flying height is about 12.5 nm, the pole tip protrusion associated with thermal heating of the recording head therefore presents a serious problem with a highly undesirable effect of a physical interference that causes the recording head to come into contact with the spinning magnetic disk. While a typical flying height may be about 12.5 nm, there are currently a significant number of low flying heads (e.g. less than 12.5 nm). In the future a steady evolution to lower flying height which exacerbates this interference problem.

This contact with the disk causes both accelerated wear and performance degradation. The wear effect is due to abrasive contact between the slider and the disk. Pulling the softly sprung slider slightly off track impacts the track following capability of the recording device.

In an attempt to resolve the foregoing problem, a number of conventional designs of magnetic read/write heads incorporate the use of a material with a coefficient of thermal expansion (CTE) that is lower than that of the substrate. Functionally, the low CTE material is generally used as an insulator between various metals in a conventional magnetic read/write head. An exemplary material used in a conventional magnetic read/write head is silicon oxide, $SiO_2$, which typically has a CTE of 2 parts per million.

In the presence of a temperature rise resulting from a thermal heating of the read/write head, such a material would tend to expand at a lower rate than the substrate, thus creating a thermally induced axial restraining force to develop between the material and the substrate. This restraining force effectively reduces the expansion of the substrate, thus tending to mitigate the natural protrusion of the pole tip.

Among some of the problems with $SiO_2$ is its poor thermal conductivity, which generally impedes the heat extraction process from the surrounding material to the $SiO_2$ material. In addition, $SiO_2$ does not reduce the temperature of the reader sensor. Thus, in spite of the low CTE associated therewith, the low thermal conductivity of $SiO_2$ does not sufficiently reduce the temperature rise of the pole tip region. Therefore, the pole tip protrusion is not adequately reduced with the use of $SiO_2$.

Another problem with $SiO_2$ is the lack of elasticity associated with its ceramic characteristics. Thus, in the presence of the thermally induced axial restraining force, the accompanied shear stress developed at the interface of $SiO_2$ and the surrounding material tends to promote a delamination of the $SiO_2$ material, thus posing a reliability problem for the read/write head of a conventional design.

In recognition of the problems associated with the use of $SiO_2$ in a conventional readtwrite head, some alternative materials have been proposed but have not been entirely successfully applied to a read/write head. As an example, while these materials such as Cr, W, possess higher thermal conductivities than $SiO_2$, they are not readily available for deposition and patterning in a recording head at a wafer-level process, and the foregoing problems of pole tip protrusion and high reader temperature have heretofore remained unresolved.

Thus, it is recognized that there still exists an unfulfilled need for an enhanced design of a recording head that provides a thermal diffusion and thermal expansion control in order to minimize the pole tip protrusion resulting from a thermal heating of the magnetic recording head during operation. Preferably, the enhanced design utilizes a more suitable material having a near-zero CTE for controlling the expansion of the recording head, a high thermal conductivity for extracting heat away from the pole tip region, and an elastic compatibility with the substrate for preventing delamination. Moreover, the new design should be incorporated into a conventional recording head at a wafer-level process without substantial modification to the existing structure of the recording head.

SUMMARY OF THE INVENTION

The enhanced recording head design satisfies the foregoing need by providing thermal diffusion and thermal expansion control in order to minimize the pole tip protrusion and reader temperature resulting from the thermal heating of the magnetic recording head during operation. According to a preferred embodiment of the present invention, the enhanced design features the use of a hybrid diffuser to be deposited onto the pole P2 layer of the recording head.

The mechanical and thermal properties of the 60–80% face-centered-cubic NiFe material Invar layer in the hybrid diffuser, such as near zero CTE and high thermal conductivity, make this material suitable for providing the necessary mechanical retention, to control the pole tip protrusion of the recording head in a manner such that:

1. The near zero CTE of the hybrid diffuser creates a restraining shear force that counteracts the thermal expansion of the pole tip region of the recording head; and 2. The high thermal conductivity of gold (Au) or copper (Cu) in the hybrid diffuser, enables the hybrid diffuser to extract the thermal sources from the recording head, thereby diffusing the high temperature, which, in turn, reduces the reader sensor temperature.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
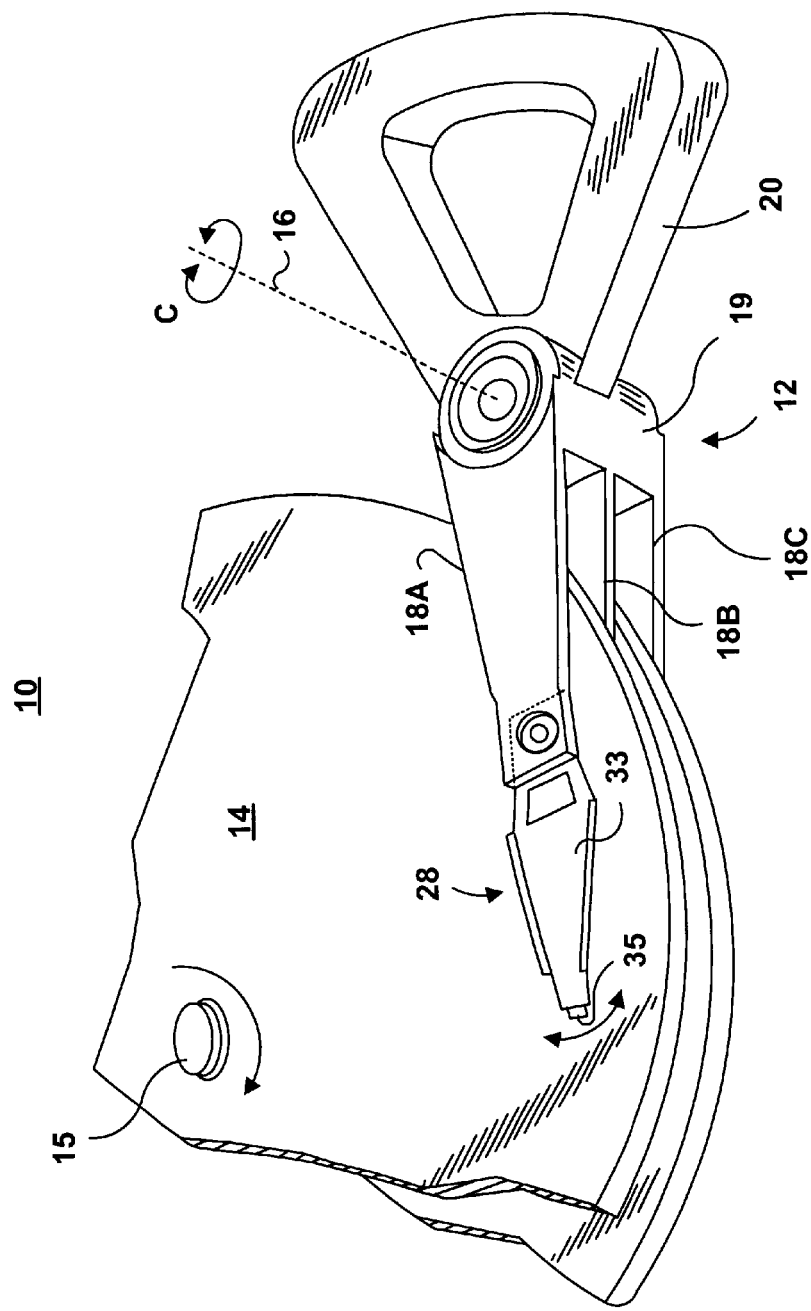
FIG. 1 is a fragmentary perspective view of a data storage system utilizing a read/write head of the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 4:
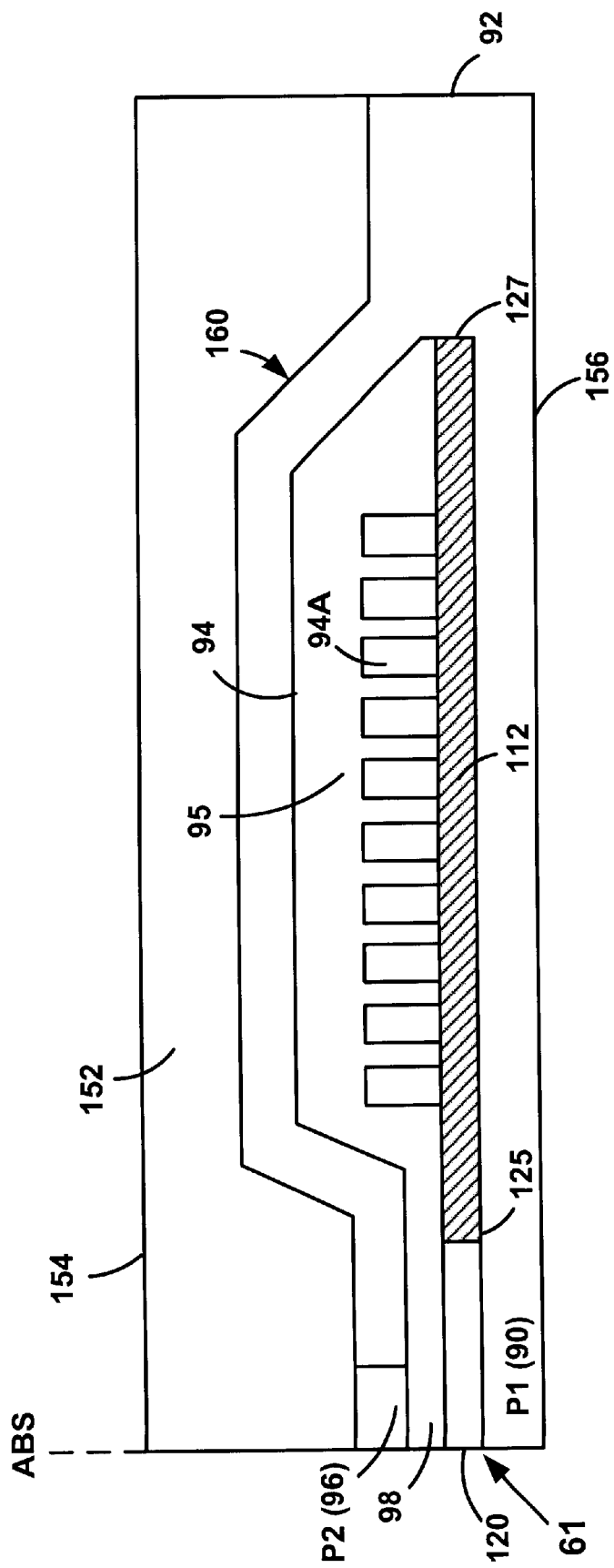
FIG. 4 is a cross-sectional view of a prior thin film read/write element.

A head gimbal assembly (HGA) 28 is secured to each of the actuator arms, for instance 18A. With reference to FIG. 4, the HGA 28 is comprised of a suspension 33 and a read/write head 35. The suspension 33 includes a resilient load beam 36 and a flexure 40 to which the head 35 is secured.

The head 35 is formed of a slider 47 secured to the free end of the load beam 36 by means of the flexure 40, and a read/write element 50 supported by the slider 47. The slider 47 can be any conventional or available slider.

Figure 2:
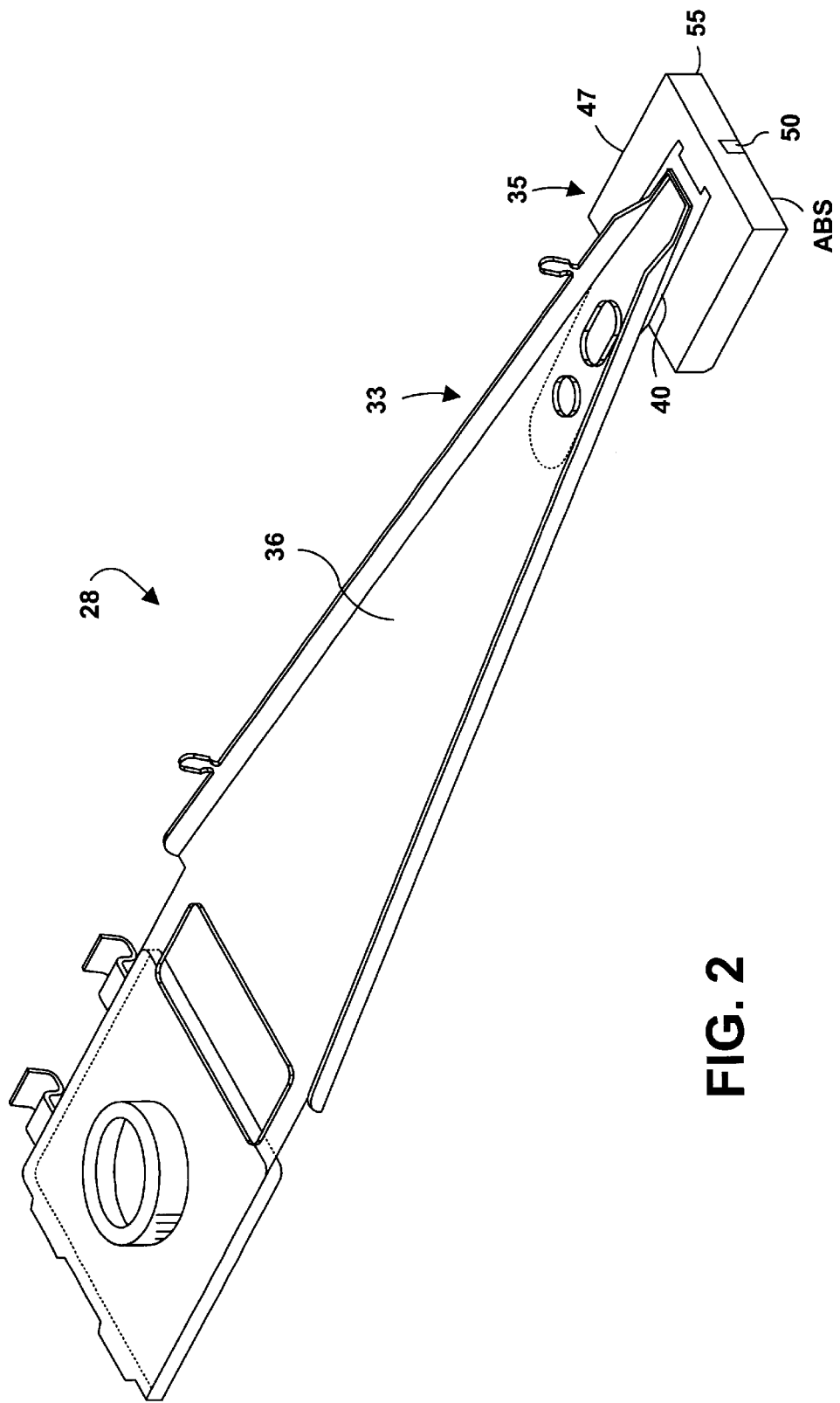
FIG. 2 is a perspective view of a head gimbal assembly comprised of a suspension, and a slider to which the read/write head of FIG. 1 is secured, for use in a head stack assembly.

In the exemplary embodiment of FIG. 2, the read/write element 50 is mounted at the trailing edge 55 of the slider 47 so that its forwardmost tip is generally flush with the ABS of the slider 47. In another embodiment according to the present invention more than one read/write element 50 can be secured to the trailing edge 55 or other side(s) of the slider 47.

Figure 3:
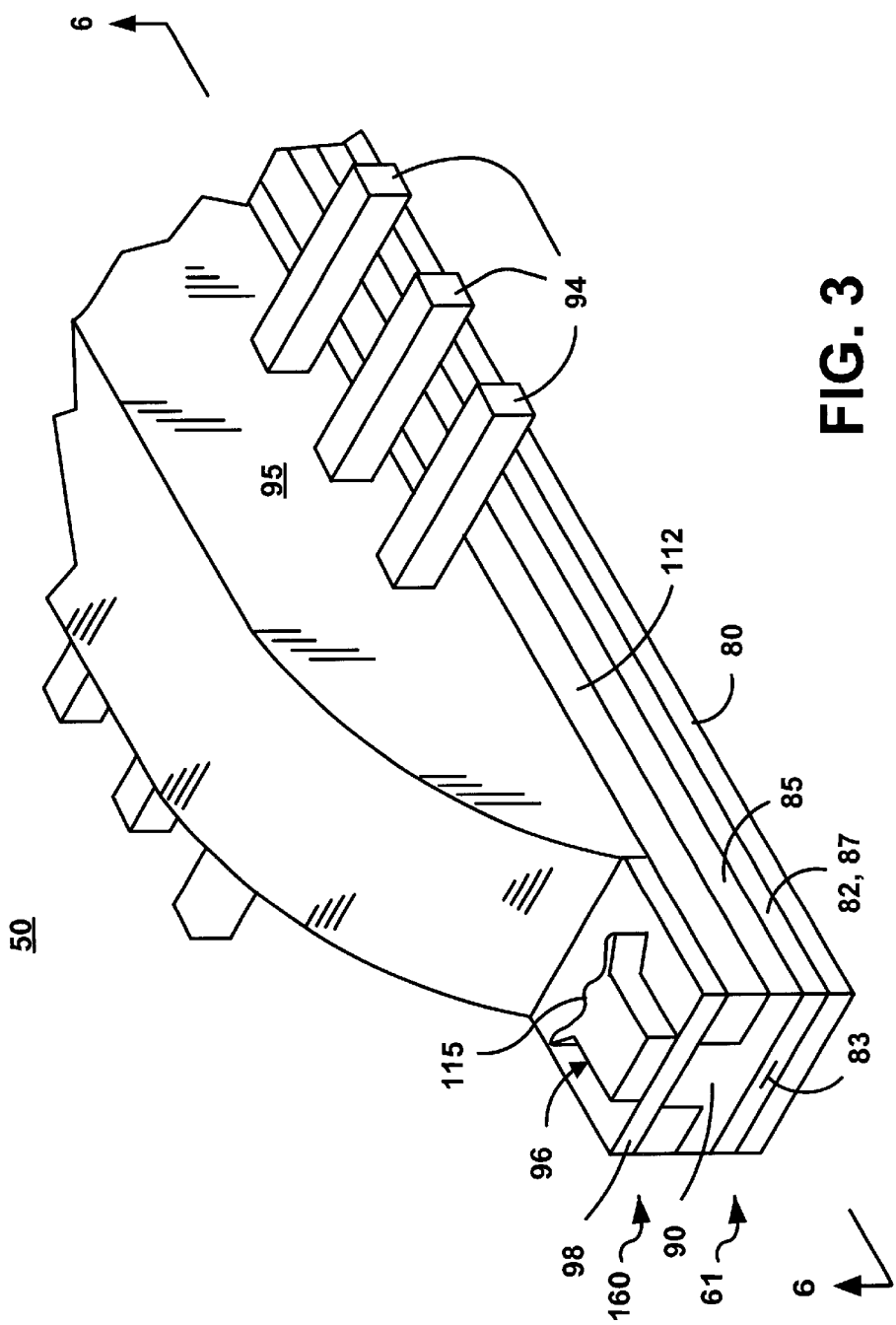
FIG. 3 is an enlarged perspective view of a thin film read/write element, with the top yoke removed, that forms part of the read/write head of FIGS. 1 and 2.

With reference to FIG. 3, the read/write element 50 integrates a read head 61 and a write section 160 incorporated into a recording head of the present invention. The read section 61 is formed of a first shield layer (Shield 1) 80 preferably made of a material that is both magnetically soft and thermally conductive. An insulating layer 82 is formed over substantially the entire surface of the first shield layer 80 to define a non-magnetic, transducing read gap 87. The read section 61 is also comprised of a read sensor 83 formed within the insulation layer 82. The read sensor 83 can be any suitable sensor, including but not limited to a magnetoresistive (MR) element, a giant magnetoresistive (GMR) element, a spin valve, or a Current In the Plane mode (CIP) sensor.

The read section 61 is also comprised of a second shield layer (Shield 2) 85 that is made of a magnetically soft and thermally conductive material, which may be similar or equivalent to that of the first shield layer 80. The second shield layer 85 is formed over substantially the entire surface of the insulating layer 82.

The write section 160 is comprised of a first pole layer or bottom pole P1 (also referenced by the numeral 90) that extends from the ABS to a back gap behind the last turn of a write coil 94. The bottom pole P1 or 90 is made of magnetically soft material, and may be for example purpose only, similar or equivalent to that of the first shield layer 80. In the exemplary embodiment of FIG. 3, the second shield layer 85 and the first pole layer P1, 90 are illustrated as being the same layer. It should however be clear that according to another embodiment of the present invention, the second shield layer 85 and the first pole layer P1, 90 can be independently formed and separated by an insulation layer therebetween.

A read circuit (not shown) is typically connected to independent leads (not shown), such that during a read mode the read circuit sends a sensing electric current $I_R$ through the sensor 83 and the shield S2.

A pedestal 120 is formed on the first pole layer 90, from the ABS to a bock face 125 that defines a zero throat level with extreme accuracy. The pedestal 120 is surrounded by a pedestal region. The zero throat level lies in a well defined plane that is generally parallel to the plane of the ABS, which in turn is co-plonor with the forward face 140 of the pedestal 120. In a preferred embodiment, the pedestal 120 extends only to a zero throat with a pedestal height ("ph") ranging from approximately 0.5 to approximately 3 $\mu$m. The pedestal height is also referred to herein as "the throat height."

The write coil 94 includes a plurality of multi-turn conductive coil elements (or conductors) 94A, only a few of which are illustrated also form part of the write section 60. The coil elements 94A are formed within an insulating layer 95. The write coil 94 can have two, four or more turns as required, typically 6 to 12 turns, to generate the desired write field. According to another embodiment of the present invention, the write coil 94 may have a multi-layer design, with typically 1, 2, or more layers.

A second pole layer or top pole P2 (also referenced by the numeral 96) is made of a magnetically soft material that can be similar or equivalent to that of the first shield layer 80 and the first pole layer 85. The second pole layer 96 is formed over, and is separated from the pedestal 120, to define a write gap 98 therewith. The thickness of the second pole layer 96 can be substantially the same as, or similar to that of the first shield layer 80. The write gap 98 can be filled with a material similar or equivalent to that of the insulating layer 82.

An insulating layer 112 is deposited between the write gap 98 and the bottom pole P1, and extends from the throat position adjoining the pedestal 120 to the back surface over substantially the entire length of the write coil 94. The insulating layer 112 is made of an insulating material, which may be similar or equivalent to that of the insulating layer 95.

For a better appreciation of the features of the present invention, it might be important to describe a conventional read/write element 460 of the prior art. Referring now to FIG. 4, the read/write element 460 is comprised of a write section 461 and an insulating layer 152. The write section 461 is generally similar in structure and design to the write section 160 of FIG. 3.

Referring now to FIG. 4, it illustrates a conventional read/write element 460 that includes an insulation layer 152. The insulation layer 152 is formed on the top pole P2 and extends from the ABS to the trailing edge surface 92 over substantially the entire surface of the write section 160. The insulation layer 152 can be made of any suitable material, for example, alumina ($Al_2O_3$), aluminum oxide or silicon nitride. The outer surface 154 of the insulation layer 152 is generally flat and parallel to the bottom surface 156 of pole P1 (90).

Figure 5:
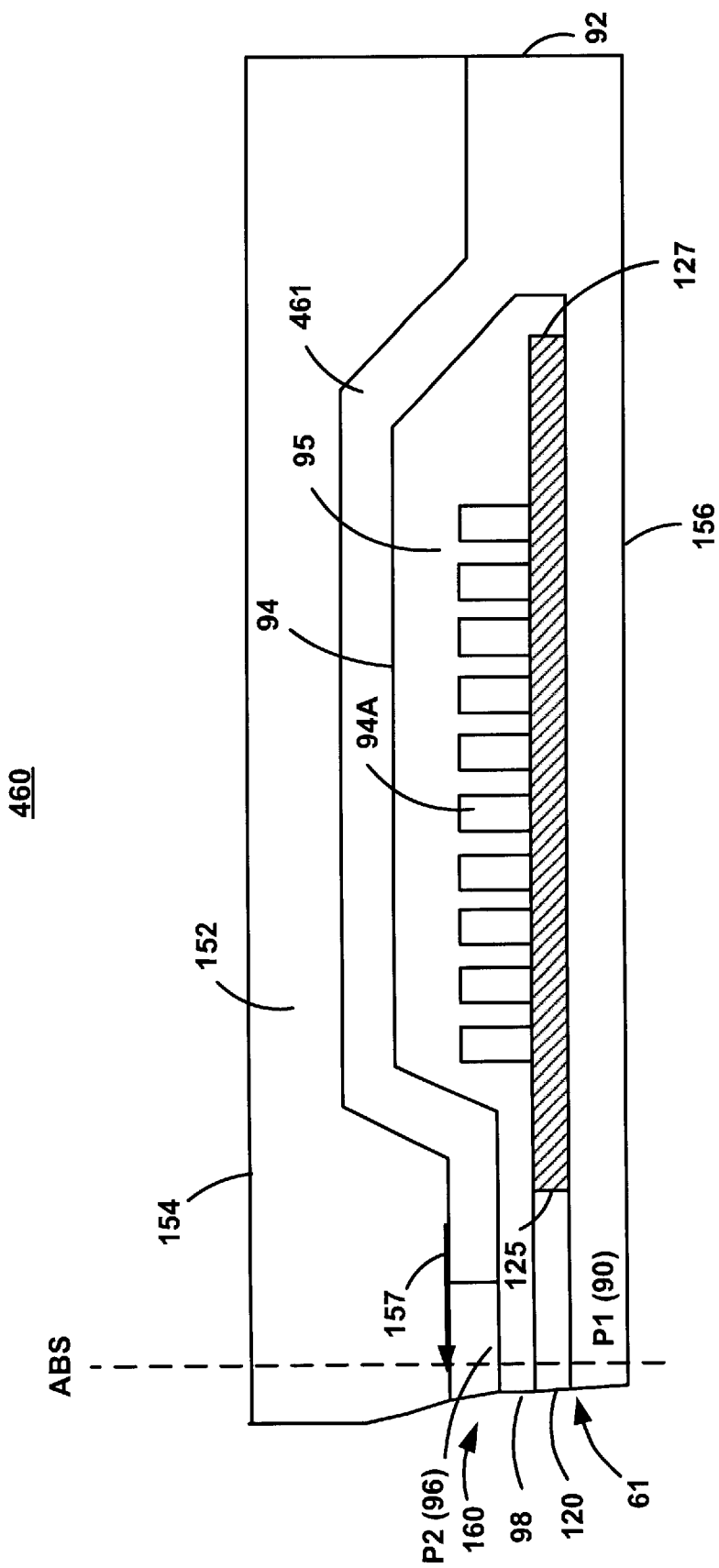
FIG. 5 another cross-sectional view of the prior thin film read/write element of FIG. 4, shown undergoing a thermal expansion process that results in a pole tip protrusion.

With reference to FIG. 5, as the conventional read/write element 460 operates in a magnetic disk drive 10, the pole tip region of the write section 160 would be flying over the surface of the spinning magnetic disk 14. The gap between the ABS and the surface of the magnetic disk 14 is typically referred to as a flying height (or fly height), which is precisely controlled to maintain a desirable distance of the pole tip relative to the surface of the magnetic disk 14. Typically, the flying height is about 12.5 nm by design in order to achieve an optimal magnetic flux induction during recording and to also maintain a safe distance so as to prevent any catastrophic, physical contact between the conventional read/write element 460 and a spinning magnetic disk 14.

During operation, the conventional read/write element 460 is subjected to a thermal heating emanating from various thermal sources, such as air friction, motor heating, and power dissipation from the read head 61. This thermal heating accompanies a rise in the temperature by about 40° C. Since initially the read/write element 460 is at room temperature, the temperature differential thus necessitates a heat conduction process, which is then taken place to distribute the temperature within the conventional read/write element 460.

As each of the various components of the conventional read/write element 460 registers a temperature increase, it undergoes an elongation of varying degree in accordance with its specific CTE. Thus, in-general the pole tip region of the conventional read/write element 460 is caused to protrude outwardly toward, and in closer proximity to the surface of the magnetic disk 14, resulting in a reduction in the flying height.

Furthermore, the top insulating layer 152 of the conventional read/write element 460 and the substrate material (not shown) generally have a greater CTE than the materials forming the read/write head. During the thermal expansion process, the highly expanding layers of the read/write head are mismatched in length with the substrate and overcoat resulting in laminar strains and stress between the layers. The final outcome is an undesirable protrusion of the pole tips toward the magnetic disk (or data storage medium) 14. As a result, the flying height of the read/write element 460 is substantially reduced to nearly zero, increasing the likelihood of a catastrophic, physical contact between the conventional read/write element 460 and the spinning magnetic disk 14.

In order to address the foregoing serious design concerns of the conventional read/write element 460, it is recognized that the thermal expansion of the write section 160 should be controlled, so as to reduce the pole tip protrusion. To this end, the present invention reduces the temperature rise within the write section 160. More specifically, the present invention introduces a hybrid diffuser design that substantially reduces the temperature rise in the read/write element. Accordingly, this novel design feature is incorporated into the write section 160 of the read/write element 460, to introduce a novel read/write element 660 of the present invention.

Figure 6:
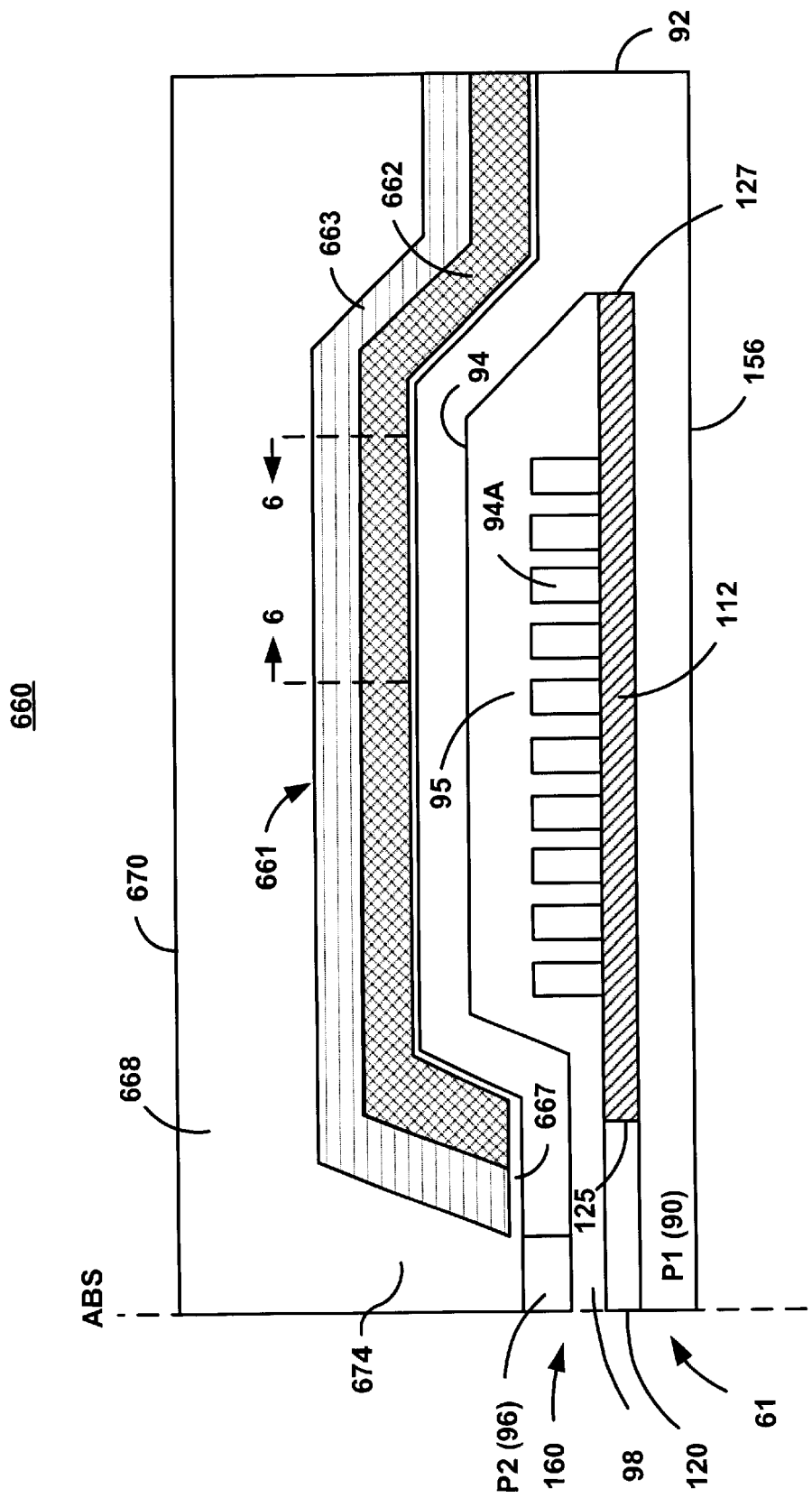
FIG. 6 is a cross-sectional view of the thin film read/write element of FIG. 3, taken along line 6—6, shown incorporating a hybrid diffuser deposited over pole P2 according to a preferred embodiment of the present invention.

FIG. 6 illustrates one embodiment of the read/write element 660 of the present invention. The read/write element 660 is comprised of a write section 160 and a hybrid diffuser 661 comprised of an overlay of a thermal conductive layer 662 and a mechanical restraint layer 663. The write section 160 is generally, but not necessarily, similar in function and design to the write section 160 that has been described earlier in connection with FIGS. 4 and 5.

The hybrid diffuser 661 is formed at a distance above the top pole P2 of the write section 160, over substantially the entire surface of the write section 160. This separation distance may vary between approximately 0.25 and 1 μm (micron). The hybrid diffuser 661 is sandwiched between an inner insulating layer 667 and an outer insulating layer 668.

The inner insulating layer 667, which is also referred to herein as a spacer, is generally composed of a suitable material, such as alumina ($Al_2O_3$), by means of a known or available deposition process. The inner insulating layer 667 extends from the ABS to the trailing edge surface 92, over substantially the entire surface of the write section 160.

Similarly to the inner insulating layer 667, the outer insulating layer 668 is generally composed of a suitable material, such as alumina ($Al_2O_3$), by, for example, the same or different deposition process, following the formation of the hybrid diffuser 661. The outer insulating layer 668 extends from the ABS to the trailing edge surface 92 of the write section 160, over substantially the entire surface of the hybrid diffuser 661. The outer surface 670 of the outer insulating layer 668 is generally flat and parallel to the bottom surface 156 of the bottom pole P1.

The hybrid diffuser 661 is formed by deposition over the inner insulating layer 667, prior to forming the outer insulating layer 668. In a preferred embodiment of the present invention, the hybrid diffuser 661 is formed by a multiple deposition process, as it will be explained later in connection with FIGS. 8 through 13. The hybrid diffuser 661 is made of a suitable material that provides the required thermal diffusion and thermal expansion control, in order to counteract undesirable pole tip protrusion and high reader temperature, resulting from thermal heating and expansion of the read/write element 660 during operation. For a preferred embodiment, the materials of choice for the hybrid diffuser 661 are: gold or copper for the thermal conduction layer 662, and Invar (or NiFe Invar) for the mechanical restraint layer 663.

Gold and copper have been selected as exemplary materials of choice for the thermal conduction layer 662 because of their high thermal conductivity values. The thermal conduction layer 662 acts as a heat sink which will cause a reduction in the head temperature.

NiFe Invar is a metallic alloy of nickel and iron or NiFe. An exemplary form of NiFe Invar material used in the preferred embodiment of the present invention is the 60–80% face-centered cubic NiFe. The face-centered cubic (FCC) metallurgical designation refers to the physical arrangement of the atoms within the physical structure of the alloy. Specifically, the FCC arrangement is one by which the metallic lattice structure is formed by eight atoms at each corner of an imaginary cube and six additional atoms located at the centers of the six faces of the cube.

In its usual form, NiFe Invar typically possesses a body-centered cubic (BCC) arrangement, whereby the metallic lattice is formed by eight atoms at each corner of the cube and one additional atom at the center of the cube. By selectively controlling deposition conditions, an FCC phase of NiFe between 60 and 80% can be deposited over the inner insulating layer 667 to form the mechanical restraint layer 663.

FCC NiFe Invar possesses certain desirable mechanical and thermal properties that enable the mechanical restraint layer 663 to achieve the objective of reducing the pole tip protrusion of the write section 160 in accordance with the present invention. In particular, due to the magnetic nature of this material, the FCC NiFe Invar possesses a near zero CTE over a temperature range from −30° C. to +130° C., excellent elasticity, high thermal conductivity, and good adhesion, all of which make it a material of choice for the mechanical restraint layer 663. The advantages afforded by its near zero CTE and high thermal conductivity will become more apparent in a further detail description in connection with FIG. 7.

he hybrid diffuser 661 is deposited upon the inner insulating layer 667 and is recessed from the ABS by a distance or recess 674 ranging between approximately 5 and 10 μm. The recess 674 is designed to prevent the delamination of the hybrid diffuser 661 due to the otherwise displacement incompatibility between the inner insulating layer 667 and the hybrid diffuser 661 at the ABS. Furthermore, the recess 674 also prevents corrosion resulting from exposure during slider processing. The good elasticity and adhesion properties of the FCC NiFe Invar further improves the retention of the hybrid diffuser 661.

Figure 7:
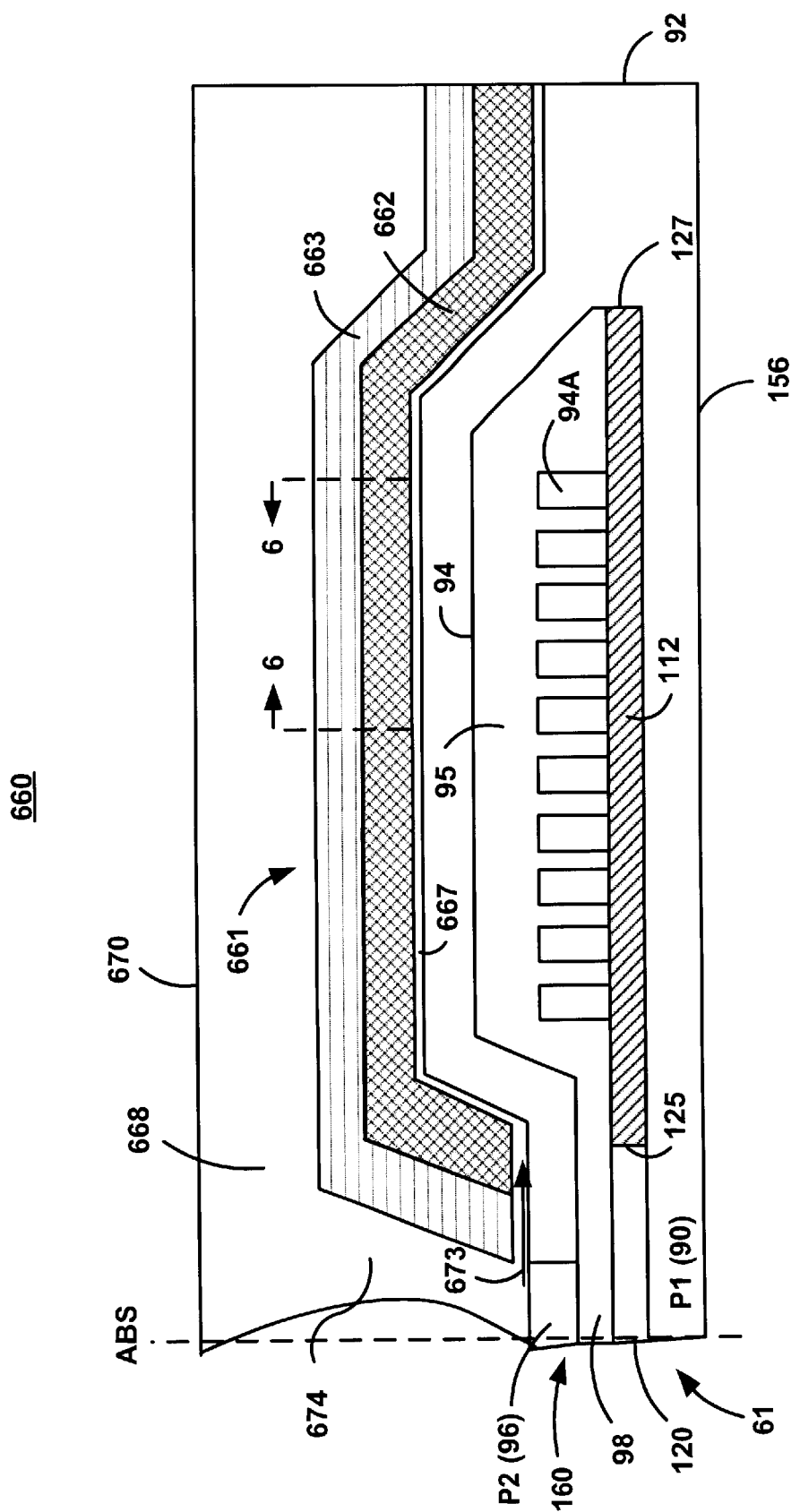
FIG. 7 is a cross-sectional view of the thin film read/write element of FIG. 6, shown undergoing a thermal expansion process that results in reduced pole tip protrusion.

With reference to FIG. 7, the read/write element 660 is illustrated after it has been subjected to a thermal heating emanating from various operation-related thermal sources, such as air friction, motor heating, and power dissipation from the read head 61. Such thermal heating could result in a temperature rise of the read/write element 660 by approximately 100° C.

Since the FCC NiFe Invar is a good thermal conductor, the hybrid diffuser 661, and more specifically the thermal conduction layer 662, acts as a theremal sink, to diffuse the heat within the read/write element 660. The high thermal conductivity of the thermal conduction layer 662 thus diffuses the high temperature within the write section 160 to maintain a lower temperature rise than that of the conventional read/write element 460. Accordingly, this lower temperature rise results in a smaller pole tip protrusion of the read/write element 660 than that of the conventional read/write element 460 (FIG. 5).

Furthermore, because of its near zero CTE, the mechanical restraint layer 663 of the hybrid diffuser 661 is dimensionally invariant under thermal heating. Thus, as the write section 160, the inner insulating layer 667, and the outer insulating layer 668 undergo a thermal expansion; albeit at a much lower degree than the conventional read/write element 460; the invariance of the mechanical restraint layer 663 effectively creates a mechanical restraining interlaminar shear force 673 to further reduce the protrusion of the pole tip region of the read/write element 660.

According to the preferred embodiment of the present invention, the resulting pole tip protrusion of the read/write element 660 could range between approximately 1 and 3 nm, which represents a substantial improvement over a typical 12 nm pole tip protrusion of the conventional read/write element 460.

It should be understood that gold, copper, and FCC NiFe Invar are some of the materials of choice that can be used in the preferred embodiment. Alternatively, various alternate embodiments of the present invention can be derived from the use of materials with similar mechanical and thermal properties.

Figure 8:
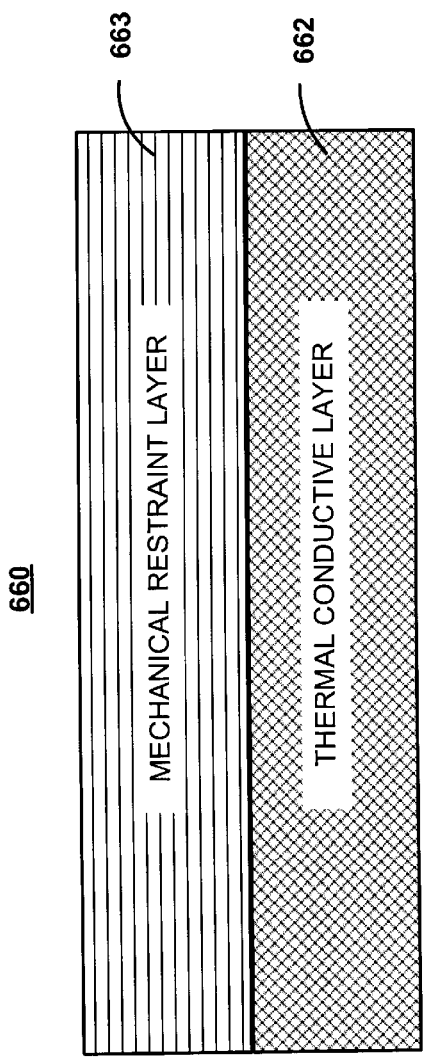
FIGS. 8–13 are cross-sectional views of the various hybrid diffusers that could be used in the read/write element of the present invention, taken along line 6—6 of FIG. 6.

Referring now to FIGS. 8–13, they illustrate various hybrid diffusers that could be used in the read/write head of the present invention. FIG. 8 illustrates the composition of the hybrid diffuser 661 of FIGS. 6 and 7, with the mechanical restraint layer 663 disposed atop, and in direct contact with the thermal conduction layer 662. The mechanical restraint layer 663 and the thermal conduction layer 662 have a similar or comparable thickness, that can vary between approximately 2.5 and microns.

Figure 9:
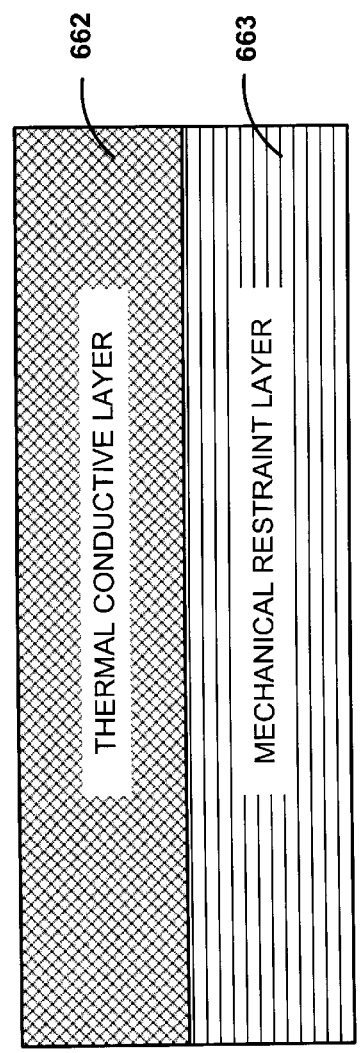

FIG. 9 illustrates the composition of an alternative hybrid diffuser 710, with the mechanical restraint layer 663 disposed under, and in direct contact with the thermal conduction layer 662. As indicated earlier with respect to FIG. 8, the mechanical restraint layer 663 and the thermal conduction layer 662 have a similar or comparable thickness.

Figure 10:
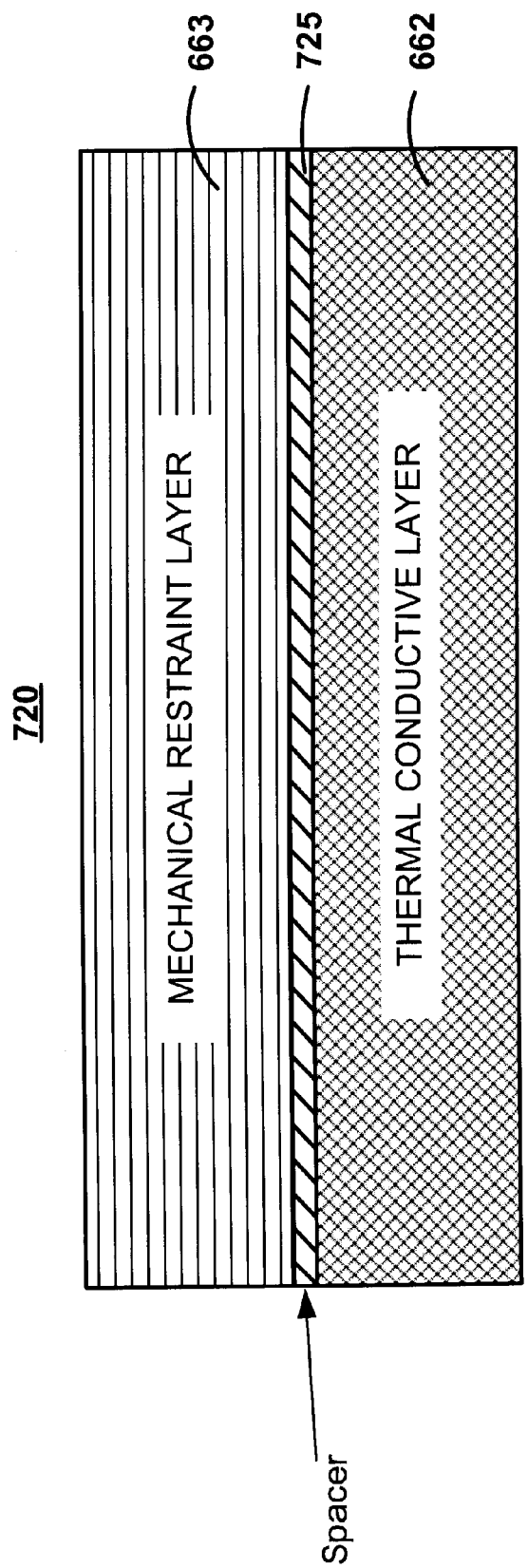

FIG. 10 illustrates the composition of another alternative hybrid diffuser 720, with the mechanical restraint layer 663 disposed atop the thermal conduction layer 662, with a spacer 725 therebetween. As indicated earlier with respect to FIGS. 8 and 9, the mechanical restraint layer 663 and the thermal conduction layer 662 have a similar or comparable thickness. The spacer 725 is made of the same or similar insulating material as the inner and the outer insulating layers 667, 668, respectively and extends along substantially the entire interface surface between the mechanical restraint layer 663 and the thermal conduction layer 662. The thickness of the spacer 725 varies between approximately 0.2 and 0.5 micron.

Figure 11:
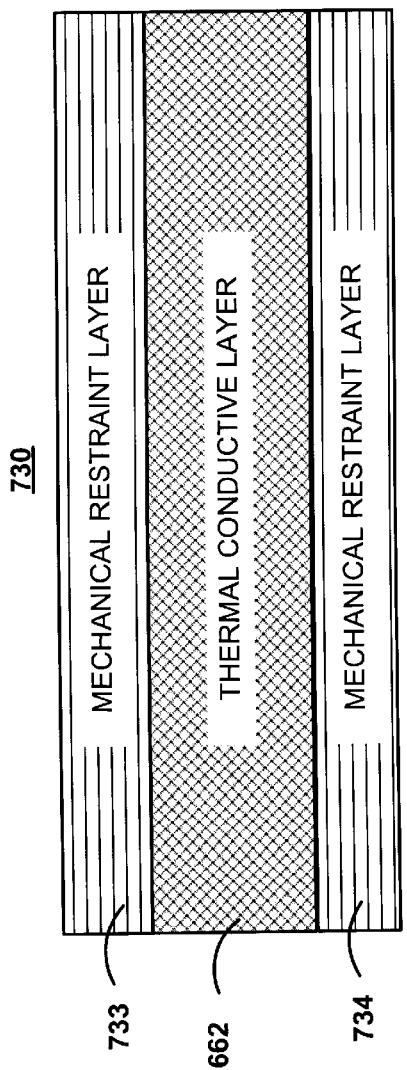

FIG. 11 illustrates the composition of yet another alternative hybrid diffuser 730, with the mechanical restraint layer being split into an upper and a lower mechanical restraint layers 733 and 734, respectively. The thermal conduction layer 662 is sandwiched between the upper mechanical restraint layer 733 and the lower mechanical restraint layer 734, and is in direct contact therewith. According to another derivative embodiment, spacers, similar to the spacer 725 of FIG. 10, can be disposed between the thermal conduction layer 662 and any or both of the upper and lower mechanical restraint layers 733 and 734. The upper and lower mechanical restraint layers 733 and 734 have a substantially similar thickness, which is equal to about one half the thickness of the thermal conduction layer 662.

Figure 12:
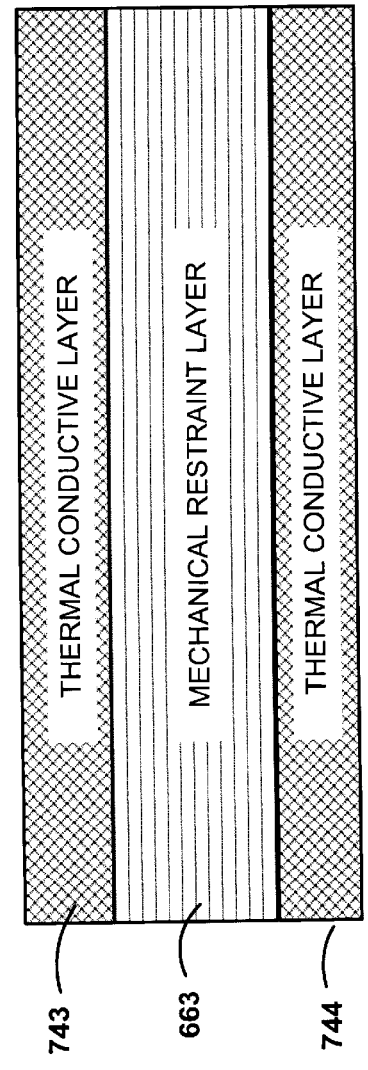

FIG. 12 illustrates the composition of yet another alternative hybrid diffuser 740, with the thermal restraint layer being split into an upper and a lower thermal conduction layers 743 and 744, respectively. The mechanical restraint layer 663 is sandwiched between the upper and lower thermal conduction layers 743 and 744, and is in direct contact therewith. According to another derivative embodiment, spacers, similar to the spacer 725 of FIG. 10, can be disposed between the mechanical restraint layer 663 and any or both of the upper and lower thermal conduction layers 743 and 744. The upper and lower thermal conduction layers 743 and 744 have a substantially similar thickness, which is substantially equal to about one half the thickness of the mechanical restraint layer 663.

Figure 13:
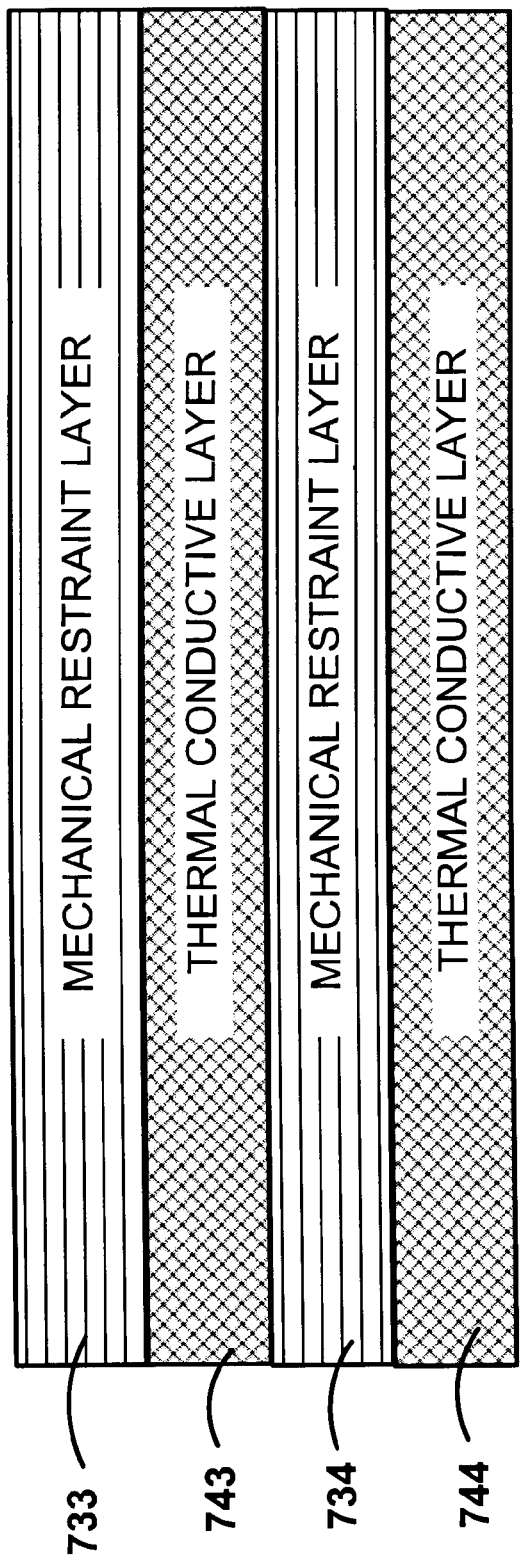

FIG. 13 illustrates the composition of still another alternative hybrid diffuser 750, with the mechanical restraint layer being split into an upper and a lower mechanical restraint layers 733 and 734, respectively, and the thermal conduction layer being split into an upper and a lower thermal conduction layers 743 and 744, respectively. The upper and lower mechanical restraint layers 733 and 734 are interleaved between the upper and lower thermal conduction layers 743 and 744, and are in direct contact therewith. The upper and lower mechanical restraint layers 733 and 734 and the upper and lower thermal conduction layers 743 and 744 have substantially the same or similar thickness, that can range between approximately 1.25 and 2.5 microns.

According to another derivative embodiment, spacers, similar to the spacer 725 of FIG. 10, can be disposed between the upper and lower mechanical restraint layers 733 and 734 and any or both the upper and lower thermal conduction layers 743 and 744. According to still another embodiment, the mechanical restraint layer can be split into two or more mechanical restraint layers, and the thermal conduction layer can be split into two or more mechanical restraint layers that can be interleaved with each others. Spacers can be selectively added between the various layers.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular environment.

What is claimed is:

1. A head with thermal diffusion and mechanical expansion control, comprising:
   a write section;
   a read section formed under the write section;
   an insulation layer formed above the write section;
   a hybrid diffuser formed within the insulation layer, at a predetermined distance from the write section, and comprised of:
      a thermal conduction layer with high thermal conductivity; and
      a mechanical restraint layer having near zero CTE, to provide mechanical retention for controlling undesirable pole tip protrusion of the head, and to dissipate heat away from the write section and the read section.

2. The head of claim 1, wherein the mechanical restraint layer is made of a face-centered-cubic metal alloy.

3. The head of claim 2, wherein the mechanical restraint layer is made of NiFe Invar.

4. The head of claim 3, wherein the mechanical restraint layer is made of a 60–80% face-centered cubic NiFe.

5. The head of claim 1, wherein the thermal conduction layer has a thermal conductivity that enables the thermal conduction layer to diffuse high temperature within the head.

6. the head of claim 1, wherein the mechanical restrin layeris formed over subtantially the entire surface of the write section.

7. The head of claim 6, wherein the the hybrid diffuser divides the insulating layer into an inner insulating layer and an outer insulating layer.

8. The head of claim 7, wherein the inner isulating layer is compossed of alumina.

9. The head of claim 7, wherein the outer isulating layer is compossed of alumina.

10. The head of claim 1, wherein the the hybrid diffuser divides from an air bearing surface by a predetermined recess distance.

11. The head of claim 10, wherein the recess distanmce range between approximately 5 and 10 microns.

12. The head claim 1, wherein the write section is comprised of a afrist pole layer P1, asecond pole layer P2.

13. The head of claim 13, wherein the mechanical restrain layer is disposed atop, and in direct contact with the thermal conduction layer.

14. the head of claim 13, wherein the mechanical restrint layer and the thermal conduction layer have a similar thickness, that can vary beetween approximately 2.5 and 5 microns.

* * * * *